US008046301B1

(12) United States Patent
Smith et al.

(10) Patent No.: US 8,046,301 B1
(45) Date of Patent: *Oct. 25, 2011

(54) SYSTEMS AND METHODS TO MODIFY A NEGOTIABLE INSTRUMENT

(75) Inventors: Arthur Quentin Smith, Fredericksburg, TX (US); John Chandler Hopkins, III, San Antonio, TX (US); Reynaldo Medina, III, San Antonio, TX (US); Bradly Jay Billman, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 159 days.

This patent is subject to a terminal disclaimer.

(21) Appl. No.: 11/927,814

(22) Filed: Oct. 30, 2007

(51) Int. Cl.
*G06Q 40/00* (2006.01)
(52) U.S. Cl. ............... 705/45; 705/1.1; 705/35; 705/42; 705/70; 235/379; 283/57; 283/58; 283/72; 382/137; 382/138; 382/139; 382/140
(58) Field of Classification Search .................... 705/35, 705/45, 1.1, 42, 70; 382/137, 138, 139, 140; 235/379; 283/57, 58, 72
See application file for complete search history.

(56) References Cited

U.S. PATENT DOCUMENTS

| | | | |
|---|---|---|---|
| 3,341,820 A | 9/1967 | Grillmeier, Jr. | |
| 3,576,972 A | 5/1971 | Wood | |
| 3,593,913 A | 7/1971 | Bremer | |
| 3,620,553 A | 11/1971 | Donovan | |
| 3,648,242 A | 3/1972 | Grosbard | |
| 3,816,943 A | 6/1974 | Henry | |
| 4,002,356 A | 1/1977 | Weidmann | |
| 4,060,711 A | 11/1977 | Buros | |
| 4,128,202 A | 12/1978 | Buros | |
| 4,136,471 A | 1/1979 | Austin | |
| 4,205,780 A | 6/1980 | Burns | |
| 4,264,808 A | 4/1981 | Owens | |
| 4,305,216 A | 12/1981 | Skelton | |

(Continued)

FOREIGN PATENT DOCUMENTS

EP 984410 A1 3/2000

OTHER PUBLICATIONS

"Check Fraud: A Guide to Avoiding Losses," *All Net*, http://all.net/books/audit/CheckFraud/security.htm, downloaded 2007, 1 page.

(Continued)

*Primary Examiner* — Elizabeth Rosen
(74) *Attorney, Agent, or Firm* — Brinks Hofer Gilson & Lione

(57) ABSTRACT

When the deposit of a negotiable instrument, such as a check, is done electronically by using a digital image of the negotiable instrument rather than the negotiable instrument itself, during the process, at least two negotiable instruments may exist: the physical negotiable instrument and the digital image of the negotiable instrument. To change the physical negotiable instrument to a non-negotiable instrument, a bank or other financial institution may send a transmission to modify the appearance of the negotiable instrument, thus effectively "voiding" the physical negotiable instrument. The negotiable instrument may have various inks or mechanisms that facilitate the modification of the appearance through the application of a stimulus, such as heat or light. The financial institution may cause the application of the stimulus to modify the appearance of the negotiable instrument.

21 Claims, 10 Drawing Sheets

U.S. PATENT DOCUMENTS

| | | | |
|---|---|---|---|
| 4,321,672 A | 3/1982 | Braun | |
| 4,523,330 A | 6/1985 | Cain | |
| 4,636,099 A | 1/1987 | Goldstone | |
| 4,640,413 A | 2/1987 | Kaplan | |
| 4,644,144 A | 2/1987 | Chandek | |
| 4,722,444 A | 2/1988 | Murphy | |
| 4,727,435 A | 2/1988 | Otani | |
| 4,774,663 A | 9/1988 | Musmanno | |
| 4,790,475 A | 12/1988 | Griffin | |
| 4,806,780 A | 2/1989 | Yamamoto | |
| 4,837,693 A | 6/1989 | Schotz | |
| 4,890,228 A | 12/1989 | Longfield | |
| 4,927,071 A | 5/1990 | Wood | |
| 4,934,587 A | 6/1990 | Mcnabb | |
| 4,960,981 A | 10/1990 | Benton | |
| 4,975,735 A | 12/1990 | Bright | |
| 5,022,683 A | 6/1991 | Barbour | |
| 5,053,607 A | 10/1991 | Carlson | |
| 5,157,620 A | 10/1992 | Shaar | |
| 5,159,548 A | 10/1992 | Caslavka | |
| 5,191,525 A | 3/1993 | LeBrun | |
| 5,220,501 A | 6/1993 | Lawlor | |
| 5,237,159 A | 8/1993 | Stephens | |
| 5,265,008 A | 11/1993 | Benton | |
| 5,321,816 A | 6/1994 | Rogan | |
| 5,350,906 A | 9/1994 | Brody | |
| 5,373,550 A | 12/1994 | Campbell | |
| 5,419,588 A | 5/1995 | Wood | |
| 5,422,467 A | 6/1995 | Graef | |
| 5,504,538 A | 4/1996 | Tsujihara | |
| 5,583,759 A | 12/1996 | Geer | |
| 5,590,196 A | 12/1996 | Moreau | |
| 5,594,225 A | 1/1997 | Botvin | |
| 5,598,969 A | 2/1997 | Ong | |
| 5,602,936 A | 2/1997 | Green | |
| 5,610,726 A | 3/1997 | Nonoshita | |
| 5,611,028 A | 3/1997 | Shibasaki | |
| 5,630,073 A | 5/1997 | Nolan | |
| 5,668,897 A | 9/1997 | Stolfo | |
| 5,673,320 A | 9/1997 | Ray | |
| 5,677,955 A | 10/1997 | Doggett | |
| 5,679,938 A | 10/1997 | Templeton | |
| 5,680,611 A | 10/1997 | Rail | |
| 5,691,524 A | 11/1997 | Josephson | |
| 5,737,440 A | 4/1998 | Kunkler | |
| 5,751,842 A | 5/1998 | Riach | |
| 5,830,609 A | 11/1998 | Warner | |
| 5,832,463 A | 11/1998 | Funk | |
| 5,863,075 A * | 1/1999 | Rich et al. | 283/94 |
| 5,870,456 A | 2/1999 | Rogers | |
| 5,870,724 A | 2/1999 | Lawlor | |
| 5,878,337 A | 3/1999 | Joao | |
| 5,897,625 A | 4/1999 | Gustin | |
| 5,903,878 A | 5/1999 | Talati | |
| 5,903,881 A | 5/1999 | Schrader | |
| 5,910,988 A | 6/1999 | Ballard | |
| 5,917,931 A | 6/1999 | Kunkler | |
| 5,924,737 A | 7/1999 | Schrupp | |
| 5,926,548 A | 7/1999 | Okamoto | |
| 5,930,778 A * | 7/1999 | Geer | 705/45 |
| 5,937,396 A | 8/1999 | Konya | |
| 5,940,844 A | 8/1999 | Cahill | |
| 5,982,918 A | 11/1999 | Mennie | |
| 5,987,439 A | 11/1999 | Gustin | |
| 6,012,048 A | 1/2000 | Gustin | |
| 6,021,202 A | 2/2000 | Anderson | |
| 6,029,887 A | 2/2000 | Furuhashi | |
| 6,030,000 A * | 2/2000 | Diamond | 283/58 |
| 6,032,137 A | 2/2000 | Ballard | |
| 6,038,553 A | 3/2000 | Hyde | |
| 6,073,119 A | 6/2000 | Bornemisza-wahr | |
| 6,085,168 A | 7/2000 | Mori | |
| 6,097,834 A | 8/2000 | Krouse | |
| 6,097,885 A | 8/2000 | Rayner | |
| 6,105,865 A | 8/2000 | Hardesty | |
| 6,145,738 A | 11/2000 | Stinson | |
| 6,151,426 A | 11/2000 | Lee | |
| 6,159,585 A | 12/2000 | Rittenhouse | |
| 6,170,744 B1 | 1/2001 | Lee | |
| 6,188,506 B1 | 2/2001 | Kaiserman | 359/288 |
| 6,189,785 B1 | 2/2001 | Lowery | |
| 6,199,055 B1 | 3/2001 | Kara | |
| 6,243,689 B1 | 6/2001 | Norton | |
| 6,278,983 B1 | 8/2001 | Ball | |
| 6,282,826 B1 | 9/2001 | Richards | |
| 6,304,860 B1 | 10/2001 | Martin, Jr. | |
| 6,314,452 B1 | 11/2001 | Dekel | |
| 6,317,727 B1 | 11/2001 | May | |
| 6,339,658 B1 | 1/2002 | Moccagatta | |
| 6,363,164 B1 | 3/2002 | Jones et al. | |
| 6,390,362 B1 | 5/2002 | Martin | |
| 6,397,196 B1 | 5/2002 | Kravetz | |
| 6,413,305 B1 * | 7/2002 | Mehta et al. | 106/31.41 |
| 6,417,869 B1 | 7/2002 | Do | |
| 6,425,017 B1 | 7/2002 | Dievendorff | |
| 6,429,952 B1 | 8/2002 | Olbricht | |
| 6,449,397 B1 | 9/2002 | Che-chu | |
| 6,450,403 B1 | 9/2002 | Martens | |
| 6,464,134 B1 | 10/2002 | Page | |
| 6,470,325 B1 | 10/2002 | Leemhuis | |
| 6,505,178 B1 | 1/2003 | Flenley | |
| 6,574,609 B1 | 6/2003 | Downs | |
| 6,578,760 B1 | 6/2003 | Otto | |
| 6,587,837 B1 | 7/2003 | Spagna | |
| 6,609,200 B2 | 8/2003 | Anderson | |
| 6,643,416 B1 | 11/2003 | Daniels | |
| 6,661,910 B2 | 12/2003 | Jones et al. | |
| 6,672,452 B1 | 1/2004 | Alves | |
| 6,682,452 B2 | 1/2004 | Quintus | |
| 6,695,204 B1 | 2/2004 | Stinson | |
| 6,726,097 B2 | 4/2004 | Graef | |
| 6,728,397 B2 | 4/2004 | Mcneal | |
| 6,742,128 B1 | 5/2004 | Joiner | |
| 6,755,340 B1 | 6/2004 | Voss | |
| 6,781,962 B1 | 8/2004 | Williams | |
| 6,786,398 B1 | 9/2004 | Stinson | |
| 6,789,054 B1 | 9/2004 | Makhlouf | |
| 6,829,704 B2 | 12/2004 | Zhang | |
| 6,844,885 B2 | 1/2005 | Anderson | |
| 6,856,965 B1 | 2/2005 | Stinson | |
| 6,883,140 B1 | 4/2005 | Acker | |
| 6,902,105 B2 | 6/2005 | Koakutsu | |
| 6,913,188 B2 | 7/2005 | Wong | |
| 6,931,591 B1 | 8/2005 | Brown | |
| 6,934,719 B2 | 8/2005 | Nally | |
| 6,957,770 B1 | 10/2005 | Robinson | |
| 6,961,689 B1 | 11/2005 | Greenberg | |
| 6,970,843 B1 | 11/2005 | Forte | |
| 6,993,507 B2 | 1/2006 | Meyer | |
| 6,996,263 B2 | 2/2006 | Jones et al. | |
| 6,999,943 B1 | 2/2006 | Johnson | |
| 7,004,382 B2 | 2/2006 | Sandru | |
| 7,010,507 B1 | 3/2006 | Anderson | |
| 7,016,704 B2 | 3/2006 | Pallakoff | |
| 7,039,048 B1 | 5/2006 | Monta | |
| 7,062,768 B2 | 6/2006 | Kubo | |
| 7,113,925 B2 | 9/2006 | Waserstein | |
| 7,114,649 B2 | 10/2006 | Nelson | |
| 7,139,594 B2 | 11/2006 | Nagatomo | |
| 7,140,539 B1 | 11/2006 | Crews | |
| 7,163,347 B2 | 1/2007 | Lugg | |
| 7,181,430 B1 | 2/2007 | Buchanan | |
| 7,197,173 B2 | 3/2007 | Jones et al. | |
| 7,200,255 B2 | 4/2007 | Jones | |
| 7,216,106 B1 | 5/2007 | Buchanan | |
| 7,249,076 B1 | 7/2007 | Pendleton | |
| 7,290,034 B2 | 10/2007 | Budd | |
| 7,299,970 B1 | 11/2007 | Ching | |
| 7,299,979 B2 | 11/2007 | Phillips | |
| 7,313,543 B1 | 12/2007 | Crane | |
| 7,321,874 B2 | 1/2008 | Dilip | |
| 7,321,875 B2 | 1/2008 | Dilip | |
| 7,325,725 B2 | 2/2008 | Foss, Jr. | |
| 7,343,320 B1 | 3/2008 | Treyz | |
| 7,349,566 B2 | 3/2008 | Jones et al. | |
| 7,377,425 B1 | 5/2008 | Ma | |
| 7,379,978 B2 | 5/2008 | Anderson | |

| Patent No. | Date | Name | | Pub. No. | Date | Name | |
|---|---|---|---|---|---|---|---|
| 7,385,631 B2 | 6/2008 | Maeno | | 2004/0103296 A1 | 5/2004 | Harp | |
| 7,386,511 B2 | 6/2008 | Buchanan | | 2004/0109596 A1 | 6/2004 | Doran | |
| 7,391,897 B2 | 6/2008 | Jones | | 2004/0122754 A1 | 6/2004 | Stevens | |
| 7,391,934 B2 | 6/2008 | Goodall et al. | | 2004/0138974 A1 | 7/2004 | Shimamura | |
| 7,392,935 B2 | 7/2008 | Byrne | | 2004/0148235 A1 | 7/2004 | Craig | |
| 7,421,107 B2 | 9/2008 | Lugg | | 2004/0158549 A1 | 8/2004 | Matena | |
| 7,440,924 B2 | 10/2008 | Buchanan | | 2004/0165096 A1 | 8/2004 | Maeno | |
| 7,447,347 B2 | 11/2008 | Weber | | 2004/0170259 A1 | 9/2004 | Park | |
| 7,460,108 B2 | 12/2008 | Tamura | | 2004/0210515 A1 | 10/2004 | Hughes | |
| 7,461,779 B2 | 12/2008 | Ramachandran | | 2004/0236647 A1 | 11/2004 | Acharya | |
| 7,461,780 B2 | 12/2008 | Potts | | 2004/0236688 A1 | 11/2004 | Bozeman | |
| 7,477,923 B2 | 1/2009 | Wallmark | | 2004/0245324 A1 | 12/2004 | Chen | |
| 7,480,382 B2 | 1/2009 | Dunbar | | 2004/0252679 A1 | 12/2004 | Williams | |
| 7,489,953 B2 | 2/2009 | Griffin | | 2004/0260636 A1 | 12/2004 | Marceau | |
| 7,490,242 B2 | 2/2009 | Torres | | 2004/0267666 A1 | 12/2004 | Minami | |
| 7,497,429 B2 | 3/2009 | Reynders | | 2005/0001421 A1 | 1/2005 | Luth | 283/57 |
| 7,506,261 B2 | 3/2009 | Satou | | 2005/0021466 A1* | 1/2005 | Buchanan et al. | 705/42 |
| 7,512,564 B1 | 3/2009 | Geer | | 2005/0033645 A1 | 2/2005 | Duphily | |
| 7,536,440 B2 | 5/2009 | Budd | | 2005/0033685 A1 | 2/2005 | Reyes | |
| 7,539,646 B2 | 5/2009 | Gilder | | 2005/0033695 A1 | 2/2005 | Minowa | |
| 7,542,598 B2 | 6/2009 | Jones | | 2005/0038754 A1 | 2/2005 | Geist | |
| 7,548,641 B2 | 6/2009 | Gilson et al. | | 2005/0044042 A1 | 2/2005 | Mendiola | |
| 7,609,873 B2 | 10/2009 | Foth et al. | | 2005/0044577 A1 | 2/2005 | Jerding | |
| 7,620,231 B2 | 11/2009 | Jones | | 2005/0049950 A1 | 3/2005 | Johnson | |
| 7,647,275 B2 | 1/2010 | Jones | | 2005/0075969 A1 | 4/2005 | Nielson | |
| 7,672,940 B2 | 3/2010 | Viola | | 2005/0078336 A1 | 4/2005 | Ferlitsch | |
| 7,702,588 B2 | 4/2010 | Gilder | | 2005/0086140 A1 | 4/2005 | Ireland | |
| 2001/0014881 A1 | 8/2001 | Drummond | | 2005/0086168 A1 | 4/2005 | Alvarez | |
| 2001/0018739 A1 | 8/2001 | Anderson | | 2005/0091161 A1 | 4/2005 | Gustin | |
| 2001/0027994 A1 | 10/2001 | Hayashida | | 2005/0096992 A1 | 5/2005 | Geisel | |
| 2001/0042171 A1 | 11/2001 | Vermeulen | | 2005/0097046 A1 | 5/2005 | Singfield | |
| 2001/0043748 A1 | 11/2001 | Wesolkowski | | 2005/0108164 A1 | 5/2005 | Salafia | |
| 2001/0047330 A1 | 11/2001 | Gephart | | 2005/0108168 A1 | 5/2005 | Halpin | |
| 2001/0054020 A1 | 12/2001 | Barth | | 2005/0115110 A1 | 6/2005 | Dinkins | |
| 2002/0001393 A1 | 1/2002 | Jones | | 2005/0131820 A1 | 6/2005 | Rodriguez | |
| 2002/0016763 A1 | 2/2002 | March | | 2005/0149436 A1 | 7/2005 | Elterich | |
| 2002/0032656 A1 | 3/2002 | Chen | | 2005/0168566 A1 | 8/2005 | Tada | |
| 2002/0052841 A1 | 5/2002 | Guthrie | | 2005/0171899 A1 | 8/2005 | Dunn | |
| 2002/0052853 A1 | 5/2002 | Munoz | | 2005/0171907 A1 | 8/2005 | Lewis | |
| 2002/0065786 A1 | 5/2002 | Martens | | 2005/0177499 A1 | 8/2005 | Thomas | |
| 2002/0072974 A1 | 6/2002 | Pugliese | | 2005/0177518 A1 | 8/2005 | Brown | |
| 2002/0075524 A1 | 6/2002 | Blair | | 2005/0182710 A1 | 8/2005 | Andersson | |
| 2002/0084321 A1* | 7/2002 | Martens et al. | 235/379 | 2005/0188306 A1 | 8/2005 | Mackenzie | |
| 2002/0116329 A1 | 8/2002 | Serbetcioglu | | 2005/0209961 A1 | 9/2005 | Michelsen | |
| 2002/0118891 A1 | 8/2002 | Rudd | | 2005/0228733 A1 | 10/2005 | Bent | |
| 2002/0120562 A1 | 8/2002 | Opiela | | 2005/0252955 A1 | 11/2005 | Sugai | |
| 2002/0138522 A1 | 9/2002 | Muralidhar | | 2005/0267843 A1 | 12/2005 | Acharya | |
| 2002/0147798 A1 | 10/2002 | Huang | | 2005/0269412 A1 | 12/2005 | Chiu | |
| 2002/0150279 A1 | 10/2002 | Scott | | 2005/0278250 A1 | 12/2005 | Zair | |
| 2002/0152161 A1 | 10/2002 | Aoike | | 2005/0281471 A1 | 12/2005 | LeComte | |
| 2002/0152164 A1 | 10/2002 | Dutta | | 2005/0289030 A1 | 12/2005 | Smith | |
| 2002/0152169 A1 | 10/2002 | Dutta | | 2006/0004660 A1 | 1/2006 | Pranger | |
| 2002/0171820 A1 | 11/2002 | Okamura | | 2006/0025697 A1 | 2/2006 | Kurzweil | |
| 2002/0178112 A1 | 11/2002 | Goeller | | 2006/0039629 A1 | 2/2006 | Li | |
| 2003/0005326 A1 | 1/2003 | Flemming | | 2006/0047593 A1 | 3/2006 | Naratil | |
| 2003/0023557 A1 | 1/2003 | Moore | | 2006/0053056 A1 | 3/2006 | Alspach-Goss | |
| 2003/0038227 A1 | 2/2003 | Sesek | | 2006/0059085 A1 | 3/2006 | Tucker | |
| 2003/0055756 A1* | 3/2003 | Allan | 705/33 | 2006/0080245 A1 | 4/2006 | Bahl | |
| 2003/0055776 A1 | 3/2003 | Samuelson | | 2006/0085357 A1 | 4/2006 | Pizarro | |
| 2003/0075916 A1 | 4/2003 | Gorski | | 2006/0102704 A1 | 5/2006 | Reynders | |
| 2003/0081824 A1 | 5/2003 | Mennie | | 2006/0106691 A1 | 5/2006 | Sheaffer | |
| 2003/0105688 A1 | 6/2003 | Brown | | 2006/0106717 A1 | 5/2006 | Randle | |
| 2003/0139999 A1 | 7/2003 | Rowe | | 2006/0110063 A1 | 5/2006 | Weiss | |
| 2003/0167225 A1 | 9/2003 | Adams | | 2006/0112013 A1 | 5/2006 | Maloney | |
| 2003/0191615 A1 | 10/2003 | Bailey | | 2006/0115141 A1 | 6/2006 | Koakutsu | |
| 2003/0191869 A1 | 10/2003 | Williams | | 2006/0118613 A1 | 6/2006 | McMann | |
| 2003/0200174 A1 | 10/2003 | Star | | 2006/0144924 A1 | 7/2006 | Stover | |
| 2004/0010466 A1 | 1/2004 | Anderson | | 2006/0144950 A1 | 7/2006 | Johnson | |
| 2004/0012496 A1* | 1/2004 | De Souza et al. | 340/572.3 | 2006/0161501 A1 | 7/2006 | Waserstein | |
| 2004/0024626 A1 | 2/2004 | Bruijning | | 2006/0206506 A1 | 9/2006 | Fitzpatrick | |
| 2004/0024708 A1 | 2/2004 | Masuda | | 2006/0214940 A1 | 9/2006 | Kinoshita | |
| 2004/0057697 A1 | 3/2004 | Renzi | | 2006/0229976 A1 | 10/2006 | Jung | |
| 2004/0058705 A1 | 3/2004 | Morgan | | 2006/0229986 A1 | 10/2006 | Corder | |
| 2004/0066031 A1 | 4/2004 | Wong | | 2006/0238503 A1 | 10/2006 | Smith | |
| 2004/0069841 A1 | 4/2004 | Wong | | 2006/0242062 A1 | 10/2006 | Peterson | |
| 2004/0078299 A1 | 4/2004 | Down-Logan | | 2006/0242063 A1 | 10/2006 | Peterson | |
| 2004/0080795 A1 | 4/2004 | Bean | | 2006/0249567 A1 | 11/2006 | Byrne | |
| 2004/0093303 A1 | 5/2004 | Picciallo | | 2006/0279628 A1 | 12/2006 | Fleming | |
| 2004/0093305 A1 | 5/2004 | Kight | | 2006/0282383 A1 | 12/2006 | Doran | |

| | | | |
|---|---|---|---|
| 2007/0016796 A1 | 1/2007 | Singhal |
| 2007/0019243 A1 | 1/2007 | Sato |
| 2007/0022053 A1 | 1/2007 | Waserstein |
| 2007/0031022 A1 | 2/2007 | Frew |
| 2007/0050292 A1 | 3/2007 | Yarbrough |
| 2007/0058851 A1 | 3/2007 | Quine |
| 2007/0063016 A1 | 3/2007 | Myatt |
| 2007/0075772 A1 | 4/2007 | Kokubo |
| 2007/0077921 A1 | 4/2007 | Hayashi |
| 2007/0080207 A1 | 4/2007 | Williams |
| 2007/0082700 A1 | 4/2007 | Landschaft |
| 2007/0084911 A1 | 4/2007 | Crowell |
| 2007/0086642 A1 | 4/2007 | Foth |
| 2007/0086643 A1 | 4/2007 | Spier |
| 2007/0094088 A1 | 4/2007 | Mastie |
| 2007/0100748 A1 | 5/2007 | Dheer |
| 2007/0129955 A1 | 6/2007 | Dalmia |
| 2007/0136198 A1 | 6/2007 | Foth et al. |
| 2007/0140594 A1 | 6/2007 | Franklin |
| 2007/0143208 A1 | 6/2007 | Varga |
| 2007/0156438 A1 | 7/2007 | Popadic |
| 2007/0168265 A1 | 7/2007 | Rosenberger |
| 2007/0171288 A1 | 7/2007 | Inoue |
| 2007/0194102 A1 | 8/2007 | Cohen |
| 2007/0241179 A1 | 10/2007 | Davis |
| 2007/0255652 A1 | 11/2007 | Tumminaro |
| 2007/0258634 A1 | 11/2007 | Simonoff |
| 2008/0002911 A1 | 1/2008 | Eisen |
| 2008/0021802 A1 | 1/2008 | Pendleton |
| 2008/0040280 A1 | 2/2008 | Davis |
| 2008/0052182 A1 | 2/2008 | Marshall |
| 2008/0059376 A1 | 3/2008 | Davis |
| 2008/0063253 A1 | 3/2008 | Wood |
| 2008/0071721 A1 | 3/2008 | Wang |
| 2008/0080760 A1 | 4/2008 | Ronca |
| 2008/0086421 A1 | 4/2008 | Gilder |
| 2008/0103790 A1 | 5/2008 | Abernethy |
| 2008/0117991 A1 | 5/2008 | Peddireddy |
| 2008/0119178 A1 | 5/2008 | Peddireddy |
| 2008/0133411 A1 | 6/2008 | Jones et al. |
| 2008/0147549 A1 | 6/2008 | Ruthbun |
| 2008/0156438 A1 | 7/2008 | Stumphauzer |
| 2008/0219543 A1 | 9/2008 | Csulits |
| 2008/0247629 A1 | 10/2008 | Gilder |
| 2008/0249931 A1 | 10/2008 | Gilder |
| 2008/0262953 A1 | 10/2008 | Anderson |
| 2009/0108080 A1 | 4/2009 | Meyer |
| 2009/0141962 A1 | 6/2009 | Borgia |
| 2009/0171819 A1 | 7/2009 | Emde |
| 2009/0171825 A1 | 7/2009 | Roman |
| 2009/0173781 A1 | 7/2009 | Ramachandran |
| 2009/0190823 A1 | 7/2009 | Walters |
| 2009/0252437 A1 | 10/2009 | Li |
| 2009/0281904 A1 | 11/2009 | Pharris |
| 2009/0313167 A1 | 12/2009 | Dujari |
| 2010/0007899 A1 | 1/2010 | Lay |

OTHER PUBLICATIONS

"What is Check Fraud," *National Check Fraud Center*, http://www.ckfraud.org/ckfraud.html, downloaded 2007, 12 pages.
White, J.M. et ai, "lmageThresholding for Optical Character Recognition and Other Applications Requiring Character Image Extraction", IBM J. Res. Develop, 1983, vol. 27.
Ritzer, J.R. "Hinky Dinky helped spearhead POS, remote banking movement", Bank System & Equipment, vol. 21, No. 12 pp. 51-54, Dec. 1984.
Dinan, R.F. Dinan et al., "lmagePlus High Performance Transaction System", IBM Systems Journal; 1990, pp. 431-434; vol. 29, No. 3.
Gupta, Amar et al., "An Integrated Architecture for Recognition of Totally Unconstrained Handwritten Numerals"; International Journal of Pattern Recognition and Artificial Intelligence; 1993, pp. 757-773; vol. 7, No. 4.
Masonson, L. "Check truncation and ACH trends—automated clearing houses," healthcare financial management association, http://WWN.findarticles.com/p/articles/mLm3276/is_n7_v47/ai_14466034/print, 1993.
Zhang, C.Y., "Robust Estimation and Image Combining," Astronomical Data Analysis Software and Systems IV, ASP Conference Series, 1995.
Kornai Andras et al., "Recognition of Cursive Writing on Personal Checks," Proceedings of International Workshop on the Frontiers in Handwriting Recognition, Sep. 1996, pp. 1-6.
De Queiroz, Ricardo et al., "Mixed RasterContent (MRC) Model for Compound Image Compression", pp. 1-12.
Rivlin, Alice M. et al., Chair, Vice Chair—Board of Governors, Committee on the Federal Reserve in The Payments Mechanisrn—Federal Reserve System, "The Federal Reserve in the Payments Mechanism", Jan. 1998.
J.D. Tygar, Atomicity in Electronic Commerce, Apr./May 1998 (Atomicity).
Anderson, Milton M. "FSML and Echeck", Financial Services Technology Consortium, 1999.
"Full Service Direct Deposit," www.nonprofitstaffing.com/images/upload/dirdepform.pdf, 2001.
Craig, Ben; "Resisting Electronic Payment Systems: Burning Down the House?", Federal Reserve Bank of Cleveland, Jul. 1999.
Rose, Sarah et al., "Best of the Web": The Top 50 Financial Websites. Money, New York Dec. 1999, vol. 28, iss12; pp. 178-187.
Furst, Karen et al., "Internet Banking: Developments and Prospects", Office of the Comptroller of the Currency—Economic and Policy Analysis Working Paper 2000-9,Sep. 2000.
Middleware, URL: http://www.cs.umanitoba.ca/maheswar/anc2002/PAPERS/bak01.pdf, Jun. 24, 2008.
Palacios, Rafael et al., "Automatic Processing of Brazilian Bank Checks", Machine Vision and Applications; 2002, pp. 1-28.
Peter, J. Wallison, "Wal-Mart Case Exposes Flaws in Banking-Commerce Split", American Banker, vol. 167. No. 8, Jan. 17, 2002.
Heckenberg, D., "Using Mac OSX for Real-Time Image Processing," 2003.
Burnett, J., "Depository Bank Endorsement Requirements," Bankersonline.com, http://www.bankersonline.com/cgi-ban/printview.pl, 2003.
Blafore, Bonnie, "Lower Commissions, Fewer Amenities." Better Investing. Madison Heights: Feb. 2003, vol. 52, iss 6; pp. 50-51.
"Direct Deposit Authorization Form" www.umass.edu/humres/library/DDForm.pdf, 2003.
Electronic Billing Problem: The E-check is in the mail-American Banker-v168, n 95, 91, May 2003.
Oxley, Michael G., from committee on Financial Services; "Check Clearing for the 21 st Century Act", 108th Congress—1st session, House of Representatives, report 108-132, Jun. 2, 2003, pp. 1-20.
Shelby, Hon. Richard C. (Chairman, Committee on Baking, Housing and Urban Affairs); "Check Truncation Act of 2003", calendar No. 168, 108th Congress, 1st Session Senate report 108-79, Jun. 25, 2003.
Knestout, Brian P. et al., "Banking Made Easy" Kiplinger's Personal Fiance, Washington :Jul. 2003, vol. 57 iss 7; pp. 44-47.
Oxley, Michael G, from the committee of conference; "Check Clearing for the 21st Century Act", 108th Congress—1st Sessi9n, House of Representatives, Report 108-291, Oct. 1, 2003, pp. 1-27.
Public Law 108-100—108th Congress; "An Act-Check Clearing for the 21 st Century Act". Oct. 28, 2003, [H. R. 1474], 117 STAT. 1177, 12 USC 5001.
Johnson, Jennifer J., Secretary of Board; Federal Reserve System, 12 CFR Part 229, Regulation CC, "Availability of Funds and Collection of Checks", 2009, pp. 1-89.
Mohl, Bruce, "Banks Reimbursing ATM Fee to Compete With Larger Rivals." Boston Globe, Boston, MA., Sep. 2004, pp. 1E.
The Automated Clearinghouse, "Retail Payment Systems; Payment Instruments, Clearing and Settlement; The Automated Clearinghouse (ACH)," www.ffiec.gov/ffiecinfobase/booklets/retailretail_o2d.html,Dec. 2005.
"Two Words Every Business Should Know: Remote Deposit," Canon, http://www.rpsolutions.com/rpweb/pdfs/ canon_rdc.pdf, 2005.
Wells Fargo 2005 News Releases, "The New Wells Fargo Electronic Deposit Services Break Through Banking Boundaries in the Age of Check 21", San Francisco Mar. 28, 2005, wwwwellsfargo.com/press/3282005_check21? year=2005.

Constanzo, Chris "Remote Check Deposit: Wells Captures a New Checking Twist", Bank Technology News Article—May 2005. www.americanbanker.com/btn_article.html?id=20050502YQ50FSG>.

Integrated Data, Message, and Process Recovery for Failure Masking in Web Services, Dissertation zur Erlangung des Grades des Doktors der Ingenieurwissenschaften der Naturwissenschaftlich-Technischen Fakultat I der Universitat des Saari andes, Saarbrucken, im Jul. 2005.

Credit Union Journal, "AFCU Averaging 80 DepositHome Transactions Per Day", Credit Union Journal, Aug. 15, 2005.

"Federal Check 21 Act, "New Check 21 Act effective Oct. 28, 2004: Bank No Longer Will Return Original Cancelled Checks, Consumer Union's FAQ's and Congressional Testimony on check 21, www.consumerlaw.orglinitiatives1contentlcheck21 - content.html.

BankServ, "depositNow: What's the difference?", 2006, DepositNow. http://www.bankserv.com/products/remoteddeposithtm, 2006, Bankserv.

Blue Mountain Consulting, from URL: www.bluemountainconsulting.com. Apr. 26, 2006.

Remotedepositcapture, URL: www.remotedepositcapture.com, 2006.

Onlinecheck.com/Merchant Advisors, "real-Time Check Debit", Merchant Advisors: Retail Check Processing Check Conversion, http://www.onlinecheck/wach/rcareal.htm, 2006.

"Compliance with Regulation CC," http://www/federalreserve.org/Pubsregccregcc.htm, Jan. 24, 2006, 6 pgs.

Chiang, Chuck Chiang, The Bulletin, "Remote banking offered", Feb. 1, 2006, http://bendbulietin.com/apps/pbcs.dll/article? AID=/20060201/BIZ0102/60201 0327&rtempi...

Federal Reserve Board, "Check Clearing for the 21st Century Act," FRB, http://www.federalreserve.gov/paymentsystems/turncation/, 2006.

Fest, G., "Patently Unaware," Bank Technology News, 412006, Retrieved from the internet at URL: http://banktechnews.com/article.html?id=20060403T7612618.

Bank Systems & Technology, Untitled Article, 5/112006, http://www.banktech.com/showarticle.jhtml? articleID=187003126>, pp. 1-4, Copyright 2004-2005 CMP Media, LLC.

Digital Transactions News, "An ACH-Image Proposal for Check Roils Banks and Networks", May 26, 2006.

BankServ Press release, "BankServ Announces New Remote Deposit Product Integrated With QuickBooks", San Francisco, Jul. 6, 2006, Remotedepositcapture.com, pp. 1-3.

Remote Deposit Capture News Article, "PNC Bank to Offer Ease of Online Deposit Service Integrated with QuickBooks to Small Businesses", Remote Deposit Capture News Articles from 7/2412006, remotedepositcapture.com, pp. 1-2.

Dias, Danilo et al., "A Model for the Electronic Representation of Bank Checks", Universidade de Brasilia.

"Check Fraud: A Guide to Avoiding Losses," All Net, http://all.netlbooks/auditlcheckfraud/security.htm, 2007.

"What is check Fraud," National Check Fraud Center, http://www.ckfraud.org/ckfraud.html, 2007.

"Remote Deposit," National City, http://www.nationalcity.com/smallbusiness/cashmanagementlremotedepositldefault.asp, 2007.

"Remote Deposit Capture," Plante & Moran, http://plantemoran.comlindustries/financialinstitutions/banklresourceslcommunity+bank+advisor/2007+summer+issue/remote+deposit+capture.htm, 2007.

"Virtual Bank Checks," Morebusiness.com, http://www.morebusiness.com/running_your_business/businessbitsld908484987.brc, 2007.

Canon, "ImageFormula CR-25, Improve Your Bottom Line With Front-Line Efficiencies", 0117W117, 1207-55/25-1 OM-BSP, 2007.

"It's the easiest way to switch banks," LNB, http://www.inbky.com/pdf/LNBswitch-kit10-07.pdf, 2007.

"Lesson 38—More Bank Transactions," Turtle Soft, http://www,turtlesoft.com/goldenseal-software-manual/lesson38. htm, 2007.

"Personal Finance," PNC, http://www.pnc.comlwebapp/unsec/productsandservice.do?sitearea=/PNC/home/personall
account+services/quick+switch/quick+switch+faqs, 2007.

"Switching Made Easy," Bank of North Georgia, http://www.banknorthgeorgia.com/cmsmaster/documents/286/documents616.pdf, 2007.

"Chapter 7 Payroll Programs," Uniform staff Payroll System, http://www2.oecn.k12.oh.us/www/ssd1/usps/usps_user_guide_005.html, 2007.

"Check 21 Solutions," Columbia Financial International, Inc. http://www.columbiafinanical.us/check21-solutions.htm, 2007.

"Direct Deposit", University of Washington, http://www.washington.edu/admin/payroll/directdeposit.html, 2007.

"Accept "Customer Not Present" Checks," Accept Check Online, http://checksoftware.com/, 2007.

"Customer Personalized Bank Checks and Address Lables" Checks Your Way, Inc., http://www.checksyourway.com/htm/web_pages/faq.htm, 2007.

"Direct Deposit Application for Payroll," Purdue, http://purdue.edu/payroll/pdf/directdepositapplication.pdf, 2007.

"Frequently Asked Questions," Bank of America, http://www.bankofamerica,com/deposits/checksave/index.cfm?template=1c_faq_bymail, 2007.

"Refractive index" wikipedia, the free encyclopedia; http://en.wikipedia.org/wiki/refractivejndex.

Patterson, Scott, "USAA Deposit@Home—Another WOW moment for Net Banking", NextCU.com, 2007.

Remotedepositcapture.com, LLC, "Remote Deposit Capture Overview," ROC Overview, http://remotedepositcapture.com/overview/RDC_overview.htm, Mar. 12, 2007.

Board of Governors of the federal reserve System, "Report to Congress on the Check Clearing for the 21 st Century Act of 2003" Apr. 2007, Submitted to the Congress pursuant to section 16 of the Check Clearing for the 21 st Century Act of 2003.

Image Master, "Photo Restoration: We specialize in digital photo restration and photograp repair of family pictures", http://www.imphotorepair.com, downloaded Apr. 2007.

"Save on ATM Fees", Chicago Tribune, Chicago, IL., Jul. 2007.

Association of German Banks, SEPA 2008: Uniform Payment Instruments for Europe, Berlin, Jul. 2007, Bundesverband deutscher banker eV.

Affinity Federal Credit Union, "Affinity announces online deposit," Aug. 4, 2005, Affinity Federal Credit Union.

"check 21—The check is not in the post", RedTitan Technology 2004./http://www.redtitan.com/check21/htm, 3 pgs.

Hartly, Thomas, "Banks Check Out New Image", Business First, Buffalo: Jul. 16, 2004, vol. 20, Iss 43, p. 1 , 3 pages.

Wade, Will, "Early Notes: Updating Consumers on Check 21" American Banker Aug. 10, 2004 (3 pages).

* cited by examiner

SYSTEMS AND METHODS TO MODIFY A NEGOTIABLE INSTRUMENT

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2007 USAA.

CROSS-REFERENCE TO RELATED APPLICATIONS

This application is related by subject matter to the subject matter disclosed in the following commonly assigned applications, the entirety of which are hereby incorporated by reference herein: U.S. patent application Ser. No. 11/927,859, U.S. patent application Ser. No. 11/927,896, U.S. patent application Ser. No. 11/927,940, and U.S. patent application Ser. No. 11/928,017, each filed on Oct. 30, 2007 and each entitled "Systems and Methods to Modify a Negotiable Instrument."

BACKGROUND

Upon the passage of the Check Clearing for the 21st Century Act (Check 21), the use of digital images for check presentment has increased dramatically, as the process typically reduces the time taken for a check to clear and the cost associated with moving paper checks from location to location. In lieu of using a physical check to clear the check clearinghouse, a scanned image is used in the process. A person, such as a bank teller, scans the physical check upon presentment by a customer at a bank. The scan creates a digital image of the check. The digital image, along with other electronic information such as amount and account holder, is submitted electronically to the federal check clearinghouse system. The system processes the digital image of the check rather than processing the physical check itself.

Banks and other institutions that process checks have realized significant benefits by using electronic presentment of checks. For example, both a reduction of the need to transport paper from the bank of presentment to the federal clearinghouse, as well as a reduction in the processing time that is necessary to clear checks has been achieved. At issue when presenting checks electronically is that the physical check may exist at the same time as the digitized form, i.e. the digital image, of the check. If the check is not destroyed, or otherwise altered, the physical check may be fraudulently presented again at either the same location or another location. Even though the check image may have been submitted for processing with the federal check clearinghouse system, the physical check may be stolen and fraudulently altered and re-presented at another location for payment. Thus, there could be multiple check items going through the clearinghouse that originate from the same physical check.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, the present subject matter addresses the shortcomings of the prior art and provides additional benefits through the use of a modifiable negotiable instrument, such as a check. The negotiable instrument may have a modifiable ink on at least one of the surfaces of the negotiable instrument. The modifiable ink changes when a stimulus is applied to the modifiable ink. When a digital image of the negotiable instrument is used to deposit funds of the negotiable instrument into a financial account, a stimulus may be applied to the modifiable ink of the negotiable instrument to change the ink. The modification changes the appearance of the physical form of the negotiable instrument. The stimulus may be, but is not limited to, a heat source, an electromagnetic signal such as light or radio waves, or a sound.

In one exemplary and non-limiting embodiment, the physical form of the negotiable instrument is voided after receiving a request to deposit an electronic form of the negotiable instrument into an account, the electronic form being a digital image of the physical negotiable instrument. The request may comprise a digital image of the negotiable instrument. After the request is received, at least one surface of the negotiable instrument is modified. In another exemplary and non-limiting embodiment, a digital image file of the negotiable instrument is created, the digital image file comprising a digital image of the negotiable instrument. A request to deposit the negotiable instrument is sent and the negotiable instrument is voided by modifying at least a surface of the negotiable instrument.

In another exemplary and non-limiting embodiment, a digital image of the negotiable instrument is received. The negotiable instrument has at least one surface with a modifiable ink which is sensitive to a stimulus. After receipt of the digital image, a communication is transmitted to apply the stimulus to negotiable instrument. In another and non-limiting embodiment, a first electronic data and a second electronic data of a negotiable instrument are received. The first electronic data is a digital image of at least one side of the negotiable instrument. The second electronic data is an amount of money to be deposited and a magnetic ink character recognition information of the negotiable instrument. The first electronic data and the second electronic data are verified and a void signal is transmitted to void the negotiable instrument. In one embodiment, the void signal causes the creation of the stimulus.

In another exemplary and non-limiting embodiment, a negotiable instrument is received. The negotiable instrument has at least one surface with modifiable ink which is sensitive to a stimulus. The stimulus causes the modifiable ink to change. A scan is initiated to generate a first electronic data and a second electronic data of the negotiable instrument. The first electronic data may be an image of at least one surface of the negotiable instrument and the second electronic data may be an amount of money to be deposited and a magnetic ink character recognition information of the negotiable instrument. The first and second electronic data are transmitted to a financial institution. A void signal is received to void the negotiable instrument. The void signal causes the application of the stimulus to the modifiable ink. The negotiable instrument may then be voided.

Other features of the subject matter are described below.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, these embodiments are not limited to the specific methods and instrumentalities disclosed. In the drawings.

DETAILED DESCRIPTION

Certain specific details are set forth in the following description and figures to provide a thorough understanding of various embodiments of the subject matter. Certain well-known details often associated with computing and software technology are not set forth in the following disclosure to avoid unnecessarily obscuring the various embodiments of the subject matter. Further, those of ordinary skill in the relevant art will understand that they can practice other embodiments of the subject matter without one or more of the details described below. Finally, while various methods are described with reference to steps and sequences in the following disclosure, the description as such is for providing a clear implementation of embodiments of the subject matter, and the steps and sequences of steps should not be taken as required to practice this subject matter.

Figure 1:
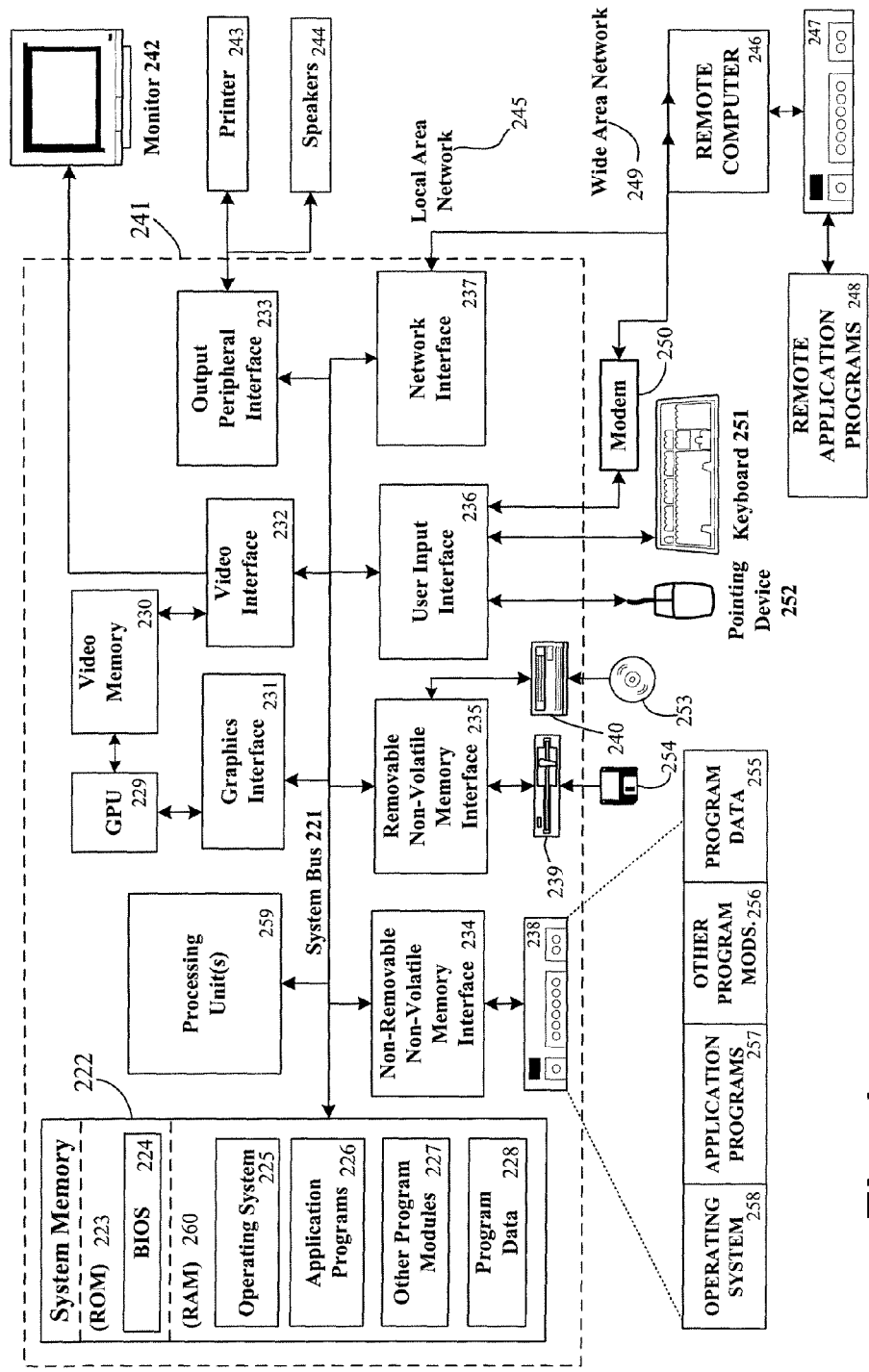
FIG. 1 is a block diagram representing an exemplary and non-limiting computing device suitable for use in conjunction with the present subject matter.

Referring to FIG. 1, shown is a block diagram representing an exemplary computing environment suitable for use in conjunction with implementing the processes described below. For example, the computer executable instructions that carry out the processes and methods for providing the subject matter of the present disclosure may reside and/or be executed in such a computing environment as shown in FIG. 1. The computing system environment 220 is only one example of a suitable computing environment and is not intended to suggest any limitation as to the scope of use or functionality of the subject matter. Neither should the computing system environment 220 be interpreted as having any dependency or requirement relating to any one or combination of components illustrated in the exemplary computing system environment 220. For example a computer game console may also include items such as those described below for use in conjunction with implementing the processes described above.

Aspects of the subject matter are operational with numerous other general purpose or special purpose computing system environments or configurations. Examples of well known computing systems, environments, and/or configurations that may be suitable for use with the subject matter include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the subject matter may be implemented in the general context of computer-executable instructions, such as program modules, being executed by a computer. Generally, program modules include routines, programs, objects, components, data structures, etc. that perform particular tasks or implement particular abstract data types. Aspects of the subject matter may also be practiced in distributed computing environments where tasks are performed by remote processing devices that are linked through a communications network. In a distributed computing environment, program modules may be located in both local and remote computer storage media, including memory storage devices.

An exemplary system for implementing aspects of the subject matter includes a general purpose computing device in the form of a computer 241. Components of computer 241 may include, but are not limited to, a processing unit 259, a graphical processing unit 229 (GPU), a video memory 230, a graphics interface 231, a system memory 222, and a system bus 221 that couples various system components including the system memory 222 to the processing unit 259. The system bus 221 may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 241 typically includes a variety of computer-readable media. Computer-readable media can be any available media that can be accessed by computer 241 and they include both volatile and nonvolatile media, removable and non-removable media. By way of example, and not limitation, computer-readable media may comprise computer-storage media and communication media. Computer-storage media includes both volatile and nonvolatile, removable and non-removable media implemented in any method or technology for storage of information such as computer readable instructions, data structures, program modules or other data. Computer-storage media includes, but is not limited to, random access memory (RAM), read-only memory (ROM), Electrically Erasable Programmable Read-Only Memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can accessed by computer 241. Communication media typically embodies computer readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

The system memory 222 includes computer-storage media in the form of volatile and/or nonvolatile memory such as ROM 223 and RAM 260. A BIOS (basic input/output system) 224 containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, non-volatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer-storage media that can be used in the exemplary operating environment include, but are not limited to, magnetic tape cassettes, flash memory cards, DVDs, digital video tape, solid state RAM, solid state ROM, and the like. The hard disk drive 238 is typically connected to the system bus 221 through a non-removable memory interface such as non-removable non-volatile memory interface 234, and magnetic disk drive 239. Optical disk drive 240 is typically connected to the system bus 221 by a removable memory interface, such as removable non-volatile memory interface 235.

The drives and their associated computer-storage media, discussed above and illustrated in FIG. 1, provide storage of computer-readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball, or touch pad. Other input devices (not shown) may include a microphone, joystick, game pad, satellite dish, scanner, or the like. These and other input devices are often connected to the processing unit(s) 259 through a user input interface 236 that is coupled to the system bus 221, but may be connected by other interface and bus structures, such as a parallel port, game port or a universal serial bus (USB). A monitor 242 or other type of display device is also connected to the system bus 221 via an interface, such as a video interface 232. In addition to the monitor 242, computer 241 may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface 237. When used in a WAN networking environment, the computer 241 typically includes a modem 250 or other means for establishing communications over the WAN 249, such as the Internet. The modem 250, which may be internal or external, may be connected to the system bus 221 via the user input interface 236 or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory storage device 247. It will be appreciated that the network connections shown are exemplary and that other means of establishing a communications link between the computers may be used.

It should be understood that the various techniques described herein may be implemented in connection with hardware or software or, where appropriate, with a combination of both. Thus, the methods and apparatus of the subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the subject matter, e.g., through the use of an API, reusable controls, or the like. Such programs are preferably implemented in a high-level procedural or object-oriented programming language to communicate with a computer system. However, the program(s) can be implemented in assembly or machine language, if desired. In any case, the language may be a compiled or interpreted language, and may be combined with hardware implementations.

Although exemplary embodiments may refer to utilizing aspects of the subject matter in the context of one or more stand-alone computer systems, the subject matter is not so limited, but rather may be implemented in connection with any computing environment, such as a network or distributed computing environment. Still further, aspects of the subject matter may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the subject matter should not be limited to any single embodiment, but rather should be construed in breadth and scope in accordance with the appended claims.

Figure 2:
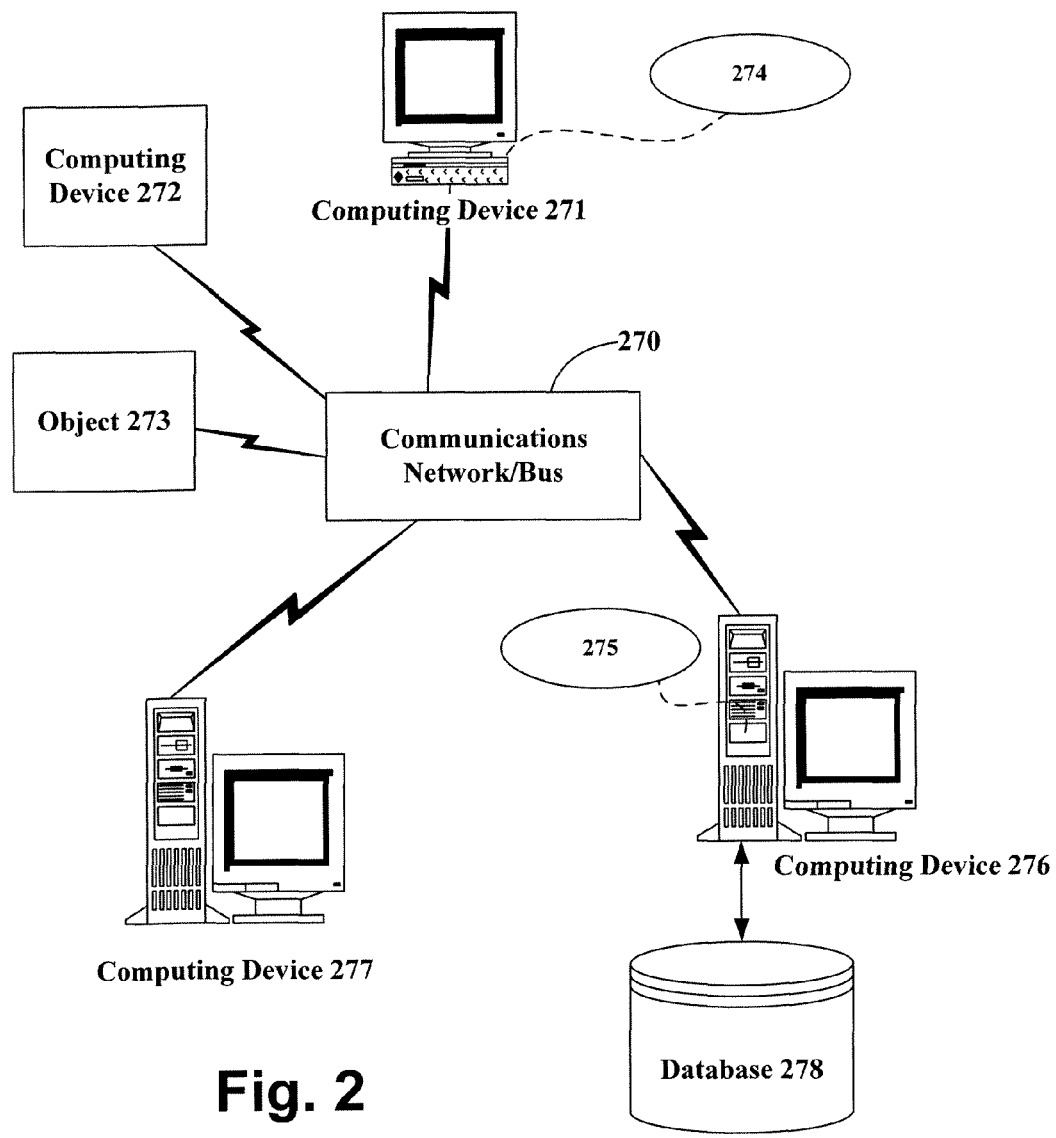
FIG. 2 illustrates an exemplary and non-limiting networked computing environment in which many computerized processes may be implemented to provide the present subject matter.

Referring next to FIG. 2, shown is an exemplary networked computing environment in which many computerized processes may be implemented to perform the processes described above. For example, parallel computing may be part of such a networked environment with various clients on the network of FIG. 2 using and/or implementing the processes for providing the subject matter of the present disclosure. One of ordinary skill in the art can appreciate that networks can connect any computer or other client or server device, or that computers may be connected in a distributed computing environment. In this regard, any computer system or environment having any number of processing, memory, or storage units, and any number of applications and processes occurring simultaneously, is considered suitable for use in connection with the systems and methods provided.

Distributed computing provides sharing of computer resources and services by exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects, or resources that may use the processes described herein.

FIG. 2 provides a schematic diagram of an exemplary networked or distributed computing environment. The environment comprises computing devices 271, 272, 276, and 277 as well as objects 273, 274, and 275, and database 278. Each of these computing devices 271, 272, 273, 274, 275, 276, 277 and 278 may comprise or make use of programs, methods, data stores, programmable logic, etc. The computing devices 271, 272, 273, 274, 275, 276, 277 and 278 may span portions of the same or different devices such as personal data assistants (PDAs), audio/video devices, MP3 players, personal computers, etc. Each computing device 271, 272, 273, 274, 275, 276, 277 and 278 can communicate with another computing device 271, 272, 273, 274, 275, 276, 277 and 278 by way of the communications network/bus 270. In this regard, any entity may be responsible for the maintenance and updating of a database 278 or other storage element.

The communications network 270 may itself comprise other computing entities that provide services to the system of FIG. 2, and may itself represent multiple interconnected networks. In accordance with an aspect of the subject matter, each computing device 271, 272, 273, 274, 275, 276, 277 and 278 may contain discrete functional program modules that might make use of an API, or other object, software, firmware and/or hardware, to request services of one or more of the other computing devices 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., or software objects such as interfaces, COM objects, and the like.

There are a variety of systems, components, and network configurations that support distributed computing environments. For example, computing systems may be connected by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, the computer systems communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to allow server or client computers to identify each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture or operating system. Instead, the subject matter should not be limited to any single embodiment, but rather should be construed in breadth and scope in accordance with the appended claims.

When a negotiable instrument is deposited using electronic means, there may arise the situation when the physical negotiable instrument "transforms" to exist in essentially two forms: the original physical negotiable instrument and the newly generated digital form. While the newly generated digital form may undergo processing through the federal check clearinghouse, the physical form is typically left in possession of the bearer of the negotiable instrument, e.g. the person that deposited the check. Although a financial institution may send instructions to the depositor to destroy or transfer possession of the physical negotiable instrument upon transmission of the digital form, the financial institution may have little to no way to force the depositor to actually destroy the negotiable instrument without limiting access to the funds. Unless the depositor destroys the negotiable instrument, the duality described above may continue to propagate, i.e. both the physical negotiable instrument and the digital form may continue to exist contemporaneously.

Thus, a financial institution may wish to cause the alteration of the physical negotiable instrument with or without the assistance of the depositor to render the physical form of the negotiable instrument non-negotiable. In other words, the financial institution may cause the alteration of the appearance of the physical negotiable instrument to a point that makes it difficult or impossible to present the physical negotiable instrument in another transaction, thus effectively destroying the negotiable instrument, with or without the participation of the depositor. For example, the appearance of the negotiable instrument may be changed to show the term, "VOID". Thus, if the negotiable instrument is presented again, the term may indicate that the holder negotiable instrument has previously deposited or attempted to deposit the negotiable instrument. The negotiable instrument may be altered in other ways and is not limited to the term used above.

Figure 3A:
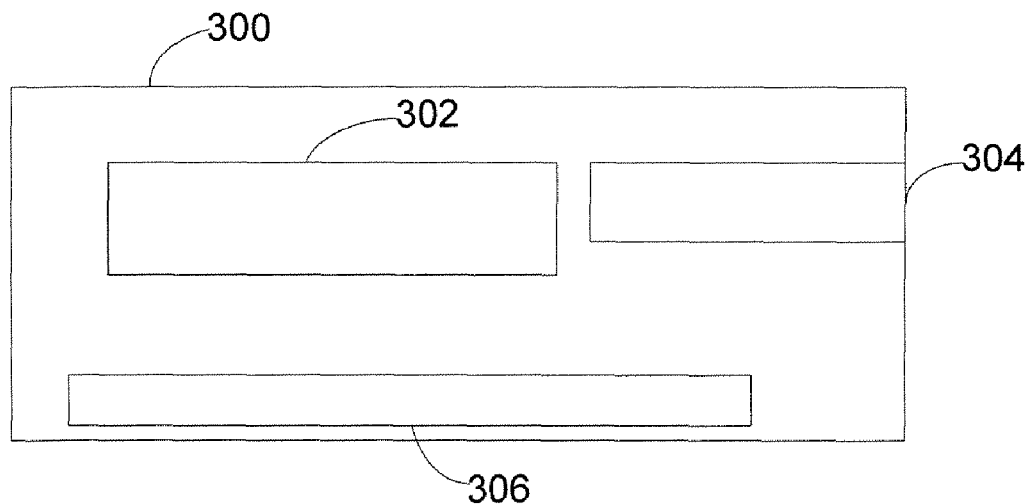
FIG. 3a is an exemplary and non-limiting modifiable negotiable instrument prior to a deposit.
Figure 3B:
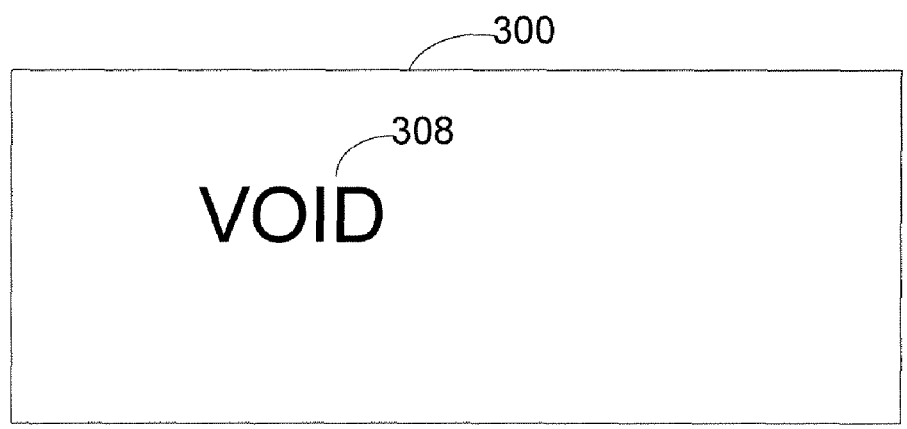
FIG. 3b is an exemplary and non-limiting modifiable negotiable instrument after a deposit.

FIG. 3a in combination with FIG. 3b are illustrative of the modification of a negotiable instrument. Shown in FIG. 3a is check 300 having redemption amount section 304, which indicates the amount of funds to be deposited into an account, and magnetic ink character recognition (MICR) section 306. The MICR section typically includes account information of the negotiable instrument, namely the routing number of the bank that holds the account and the account number the negotiable instrument is to be drawn against, e.g. the bank and the account from which the funds are to be withdrawn. The MICR information is typically printed using a magnetic ink or toner containing iron oxide. In a deposit process, the image of check 300 may be a first electronic data of the check as well as other information, such as sections 306 or 304, which may be second electronic data.

Check 300 also has unmodified modifiable section 302. Unmodified modifiable section 302 may use various types of modifiable inks or other mechanisms so that when a stimulus is applied to unmodified modifiable section 302, the ink or mechanism changes in appearance or structure to indicate a deposit process may have occurred. The change may be permanent or temporary. There are various types of ink that may be used, the present disclosure not being limited to any one particular type. Some examples of modifiable inks are inks sensitive to light, heat or sound. An ink that is sensitive to light may be configured to modify based upon exposure to a certain magnitude of light for a certain period of time. For example, a light sensitive ink may change its appearance based upon a bright light, such as a light from a scanner, being applied for a long period of time. The time may be determined based upon various scan speeds of a typical scanner. For example, the scan speed of a scanner at a high resolution may be slower than the scan speed of a scanner at a low resolution.

If the ink is sensitive to heat, the ink may be configured to modify its appearance based upon the heat generated by the application of a bright light source, such as one that may be found in a scanner. If the light source is applied for a long period of time, the ink may be configured such that the heat generated by the absorption of the light by the ink will create a certain amount of heat within the ink, thus causing the change in the ink. Unmodified modifiable section 302 may also have a mechanism sensitive to other types of stimuli, such as a radio frequency identification (RFID) tag. When the RFID tag receives a particular radio signal, the RFID tag may be modified. When the RFID tag is read at a later time, the modification may indicate that the deposit of the negotiable instrument may have occurred. The RFID tag may also, among other uses, be used to track the location of check 300.

FIG. 3b illustrates an exemplary and non-limiting way in which a negotiable instrument may be modified. Check 300 has modified modifiable section 308, which in FIG. 3a was unmodified modifiable section 302. After the application of a stimulus to unmodified modifiable section 302, the ink or mechanism within unmodified modifiable section 302 may be changed to show modified modifiable section 308. Check 300 now shows the term, "VOID" within modified modifiable section 308. The change may be used to provide information to prevent a second or subsequent presentment of check 300 for deposit.

Figure 3C:
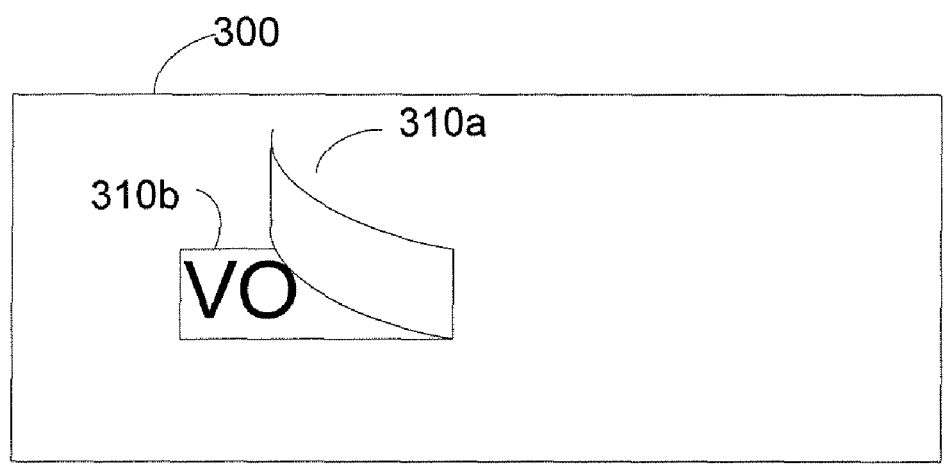
FIG. 3c is an exemplary and non-limiting modifiable negotiable instrument using a removable cover.

FIG. 3c illustrates an ink sensitive to various stimuli that modifies after removal of a protective cover. Check 300 has removable coating 310a which seals modifiable ink section 310b from exposure to stimuli. The stimuli may be of various types, including, but not limited to, air or light. For example, prior to deposit of the negotiable instrument, there may be a requirement to remove coating 310a to indicate the underlying code, which in FIG. 3c is shown as "VO". Upon removal of coating 310a, ink section 310b is exposed to light, causing the ink to modify to show "VO". Thus, coating 310a may be of a range of materials that blocks the exposure of section 310b to a stimulus.

Once exposed, ink section 310b may be permanently or temporarily modified Ink section 310b indicia may also be encoded to increase the difficulty of defeating the void process. For example, ink section 310b may be a bar code unique to check 300 itself and may be designed in a manner that is difficult to determine what the bar code will be. In order to deposit check 300, coating 310a may be removed to show the encoded indicia. If the indicia is encoded, the user may be forced to remove coating 310a because of the difficulty of determining the code without exposing the indicia by removing coating 310a.

Figure 4:
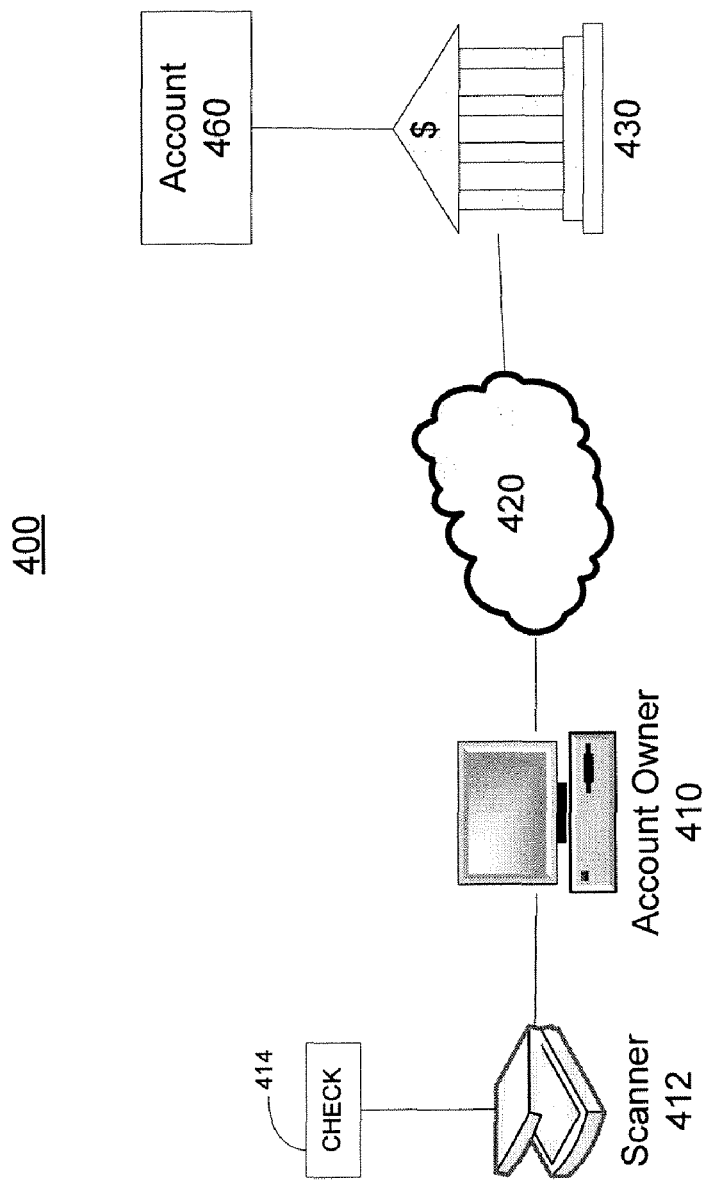
FIG. 4 is an exemplary and non-limiting diagram illustrating a system for voiding a negotiable instrument.

FIG. 4 illustrates a system to deposit a check into an account. In one exemplary and non-limiting embodiment, account owner 410 has account 460 with bank 430. Account owner 410 opens a communication pathway with bank 430 via Internet connection 420 to send a deposit request to deposit check 414 into account 460. Account owner 410 scans at least one surface of check 414 using scanner 412. Scanner 412 creates a digital image of the surface of check 414 that was scanned and saves that digital image as a digital image file. The digital image file may also contain other information about check 414, including MICR information, account information, or deposit amount. Account owner 410 transmits the digital image file to bank 430, which processes the deposit.

After the deposit is processed, bank 430 may wish to prevent the use of check 414 in another deposit operation. In one exemplary and non-limiting embodiment, bank 430 may cause the modification of check 414 to prevent a subsequent presentment of check 414. Bank 430 may send a communication to account owner 410 to void the check. The communication may be directed at scanner 412 with or without the knowledge of account owner 410. In other words, bank 430 may not complete the deposit operation if account owner 410 intercedes in the void operation. Bank 430 may send a signal to scanner 412 to scan a surface of check 414 at a speed to cause the modification of an ink section on check 414, as described above. Once the scan operation is completed, bank 430 may wait to complete the deposit operation until a communication or notice is received that check 414 was voided. The notice may include the slow scanned image showing the modification of check 414.

Figure 5:
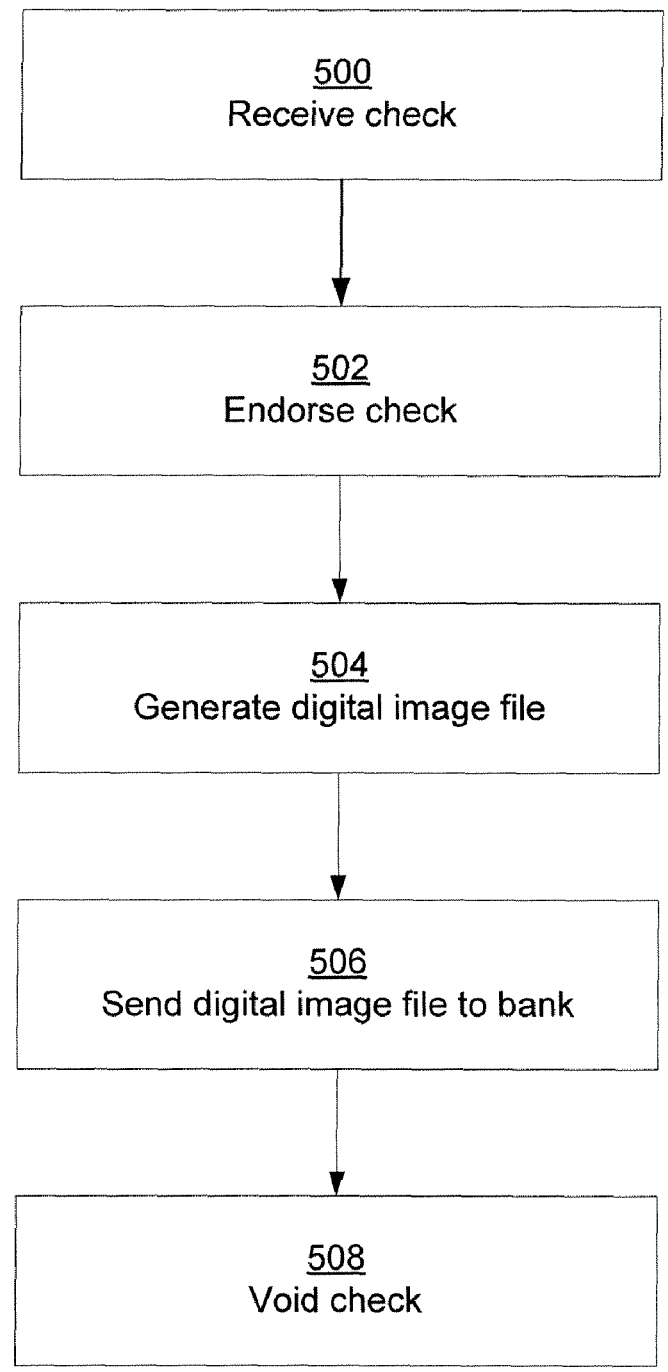
FIG. 5 is an exemplary and non-limiting flow diagram illustrating how a user may deposit a modifiable negotiable instrument.

FIG. 5 illustrates a deposit process using a modifiable check. A user receives 500 a check from another individual, for example, if the user is owed money or the check is used as payment for a good or service. The user endorses 502 the check by signing the check, thus indicating the intent to deposit the check into an account. The user generates 504 a digital image file by scanning at least one surface of the check using a scanner. The user sends 506 the digital image file to the bank which controls the user's account. After processing the deposit request, a communication is generated and transmitted to void 508 the check. The communication may be directed to the user and/or may be directed to another mechanism. For example, the communication may be directed to the user's scanner with or without the knowledge of the user. The communication may contain instructions to re-scan the check at a certain speed to cause the application of a stimulus to modify the check.

Figure 6:
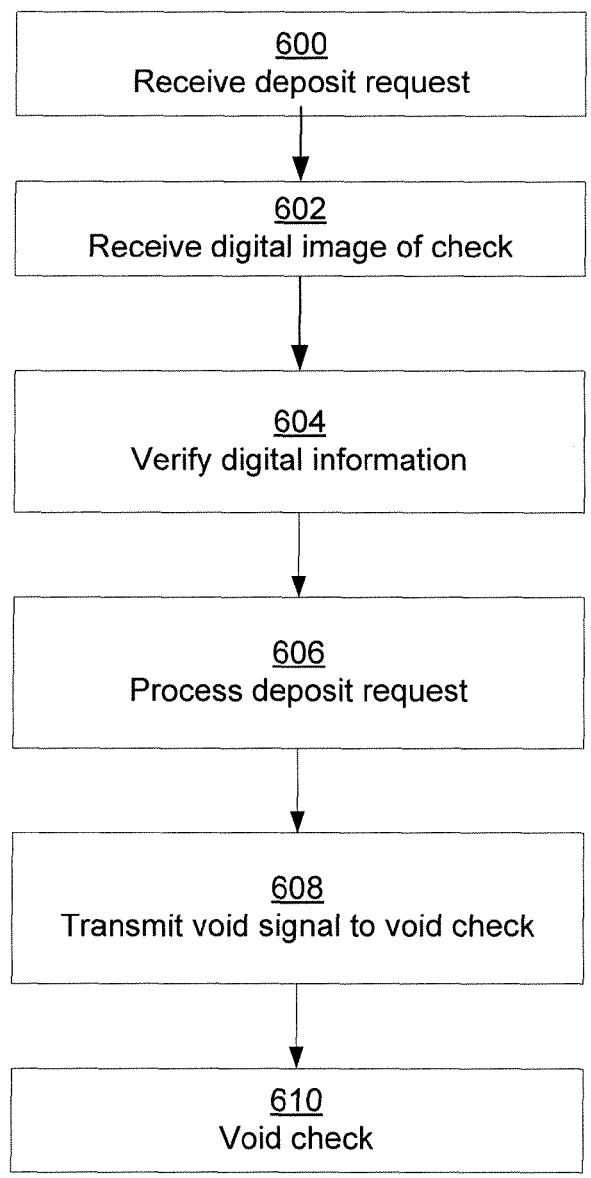
FIG. 6 is an exemplary and non-limiting flow diagram illustrating how a financial institution may process a deposit of a modifiable negotiable instrument.

FIG. 6 illustrates processing a deposit request. The bank receives 600 a deposit request from a user. After acknowledging the deposit request, the bank then receives 602 a digital image of the check. The digital image may be used by the bank to process the deposit request. The digital image may be used alone or in conjunction with additional information such as MICR information. After verifying 604 the digital information, the bank processes 606 the deposit request. The verification may include, but is not limited to, the verification of the quality of the digital image, the verification of any data retrieved from the digital image, the verification of additional information received along with the digital image, and/or the verification that the check has not been deposited before. After the bank verifies 604 the digital information received and processes 606 the deposit request, the bank then may transmit 608 a void signal to void the check. As described earlier, there may be various manners in which to void the check, including, but not limited to, the application of a stimulus such as light, heat or sound. Upon application of the stimulus, the check is voided 610.

Figure 7:
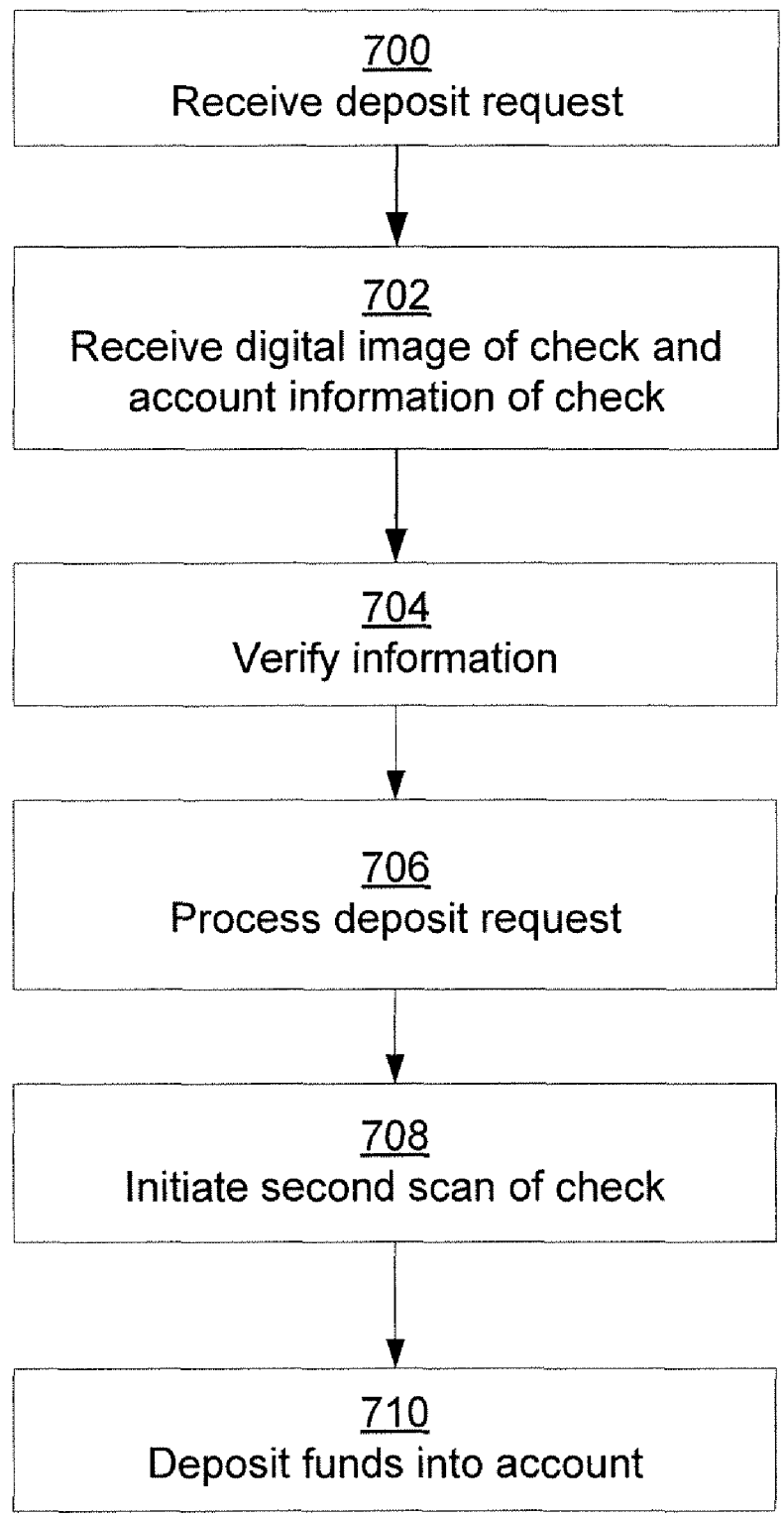
FIG. 7 is an exemplary and non-limiting flow diagram illustrating the modification of a modifiable negotiable instrument using a scanning process.

As described earlier, there may be various ways in which a check that is modifiable by the application of a stimulus is voided. FIG. 7 illustrates one such way: a scanner is used to apply the stimulus. A bank receives 700 a deposit request. The bank then receives 702 a digital image of the check and account information. The bank verifies 704 the information and processes 706 the deposit request. After the deposit is in process, to complete the process, the bank transmits 708 a void signal to the user's scanner. The void signal may contain instructions to rescan a surface of the check at a certain speed to cause the application of a stimulus. The ink may be modified based upon the application of a certain magnitude or brightness of light, or heat may be generated by that brightness of light, for a certain amount of time, which may correspond to a scan speed. After the stimulus is applied, the bank deposits 710 the funds into the user's account.

Figure 8:
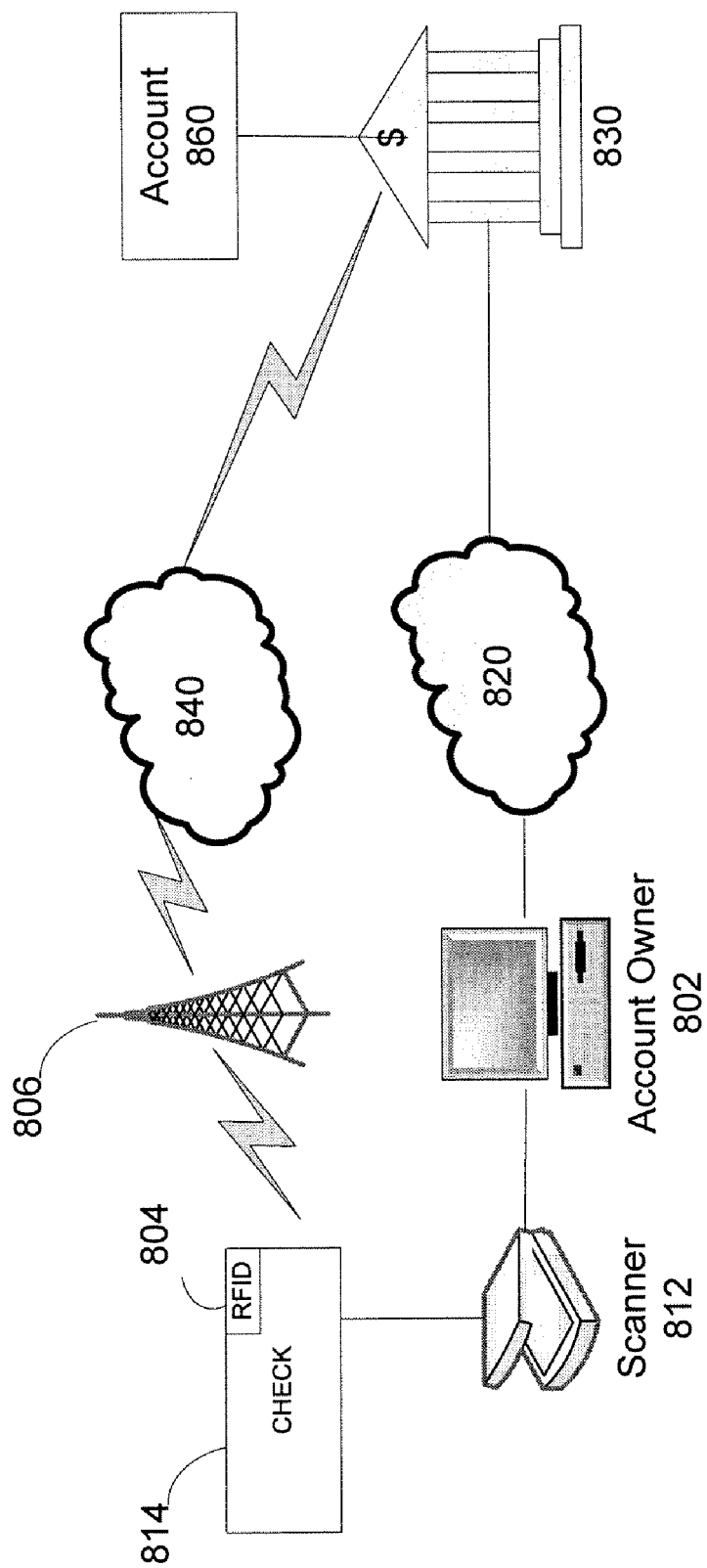
FIG. 8 is an exemplary and non-limiting system for modifying a negotiable instrument using a radio signal.

The present disclosure may incorporate a check modifiable by various stimuli. FIG. 8 illustrates a system that uses radio waves to modify a check. Check 814 has embedded RFID tag 804. RFID tag 804 is an object that is sensitive to radio signals and can be incorporated into check 814. RFID tag 804 can be read and modified at various distances. Typically, an RFID tag, such as RFID tag 804, has two parts: an integrated circuit for storing and processing information as well as receiving instructions via radio waves and an antenna for receiving and transmitting a signal. Some RFID tags do not have the integrated circuit, thus reducing cost and bulk of using an RFID tag.

The RFID tag may be programmed to initially indicate that check 814 has not been deposited. Account owner 802 may use scanner 812 to deposit check 814 into account 860 of bank 830 using communication pathway 820. After check 814 is deposited into account 860, bank 830 may wish to modify RFID tag 804 to indicate that check 814 has been deposited. Thus, when the information contained by RFID tag 804 is subsequently read, RFID tag 804 may indicate that check 814 has previously been deposited. Bank 830 may cause radio transmitter 806 to transmit a radio communication, through communication connection 840, to RFID tag 804 of check 814. The radio signal may cause RFID tag 804 to modify its information to indicate that check 814 has been previously deposited. Communication connection 840 may be of various types, including, but not limited to, a wireless cellular connection or an internet connection. Additionally, radio transmitter 806 may be of various types, including, but not limited to, a local internet access point and a cellular transceiver.

Figure 9:
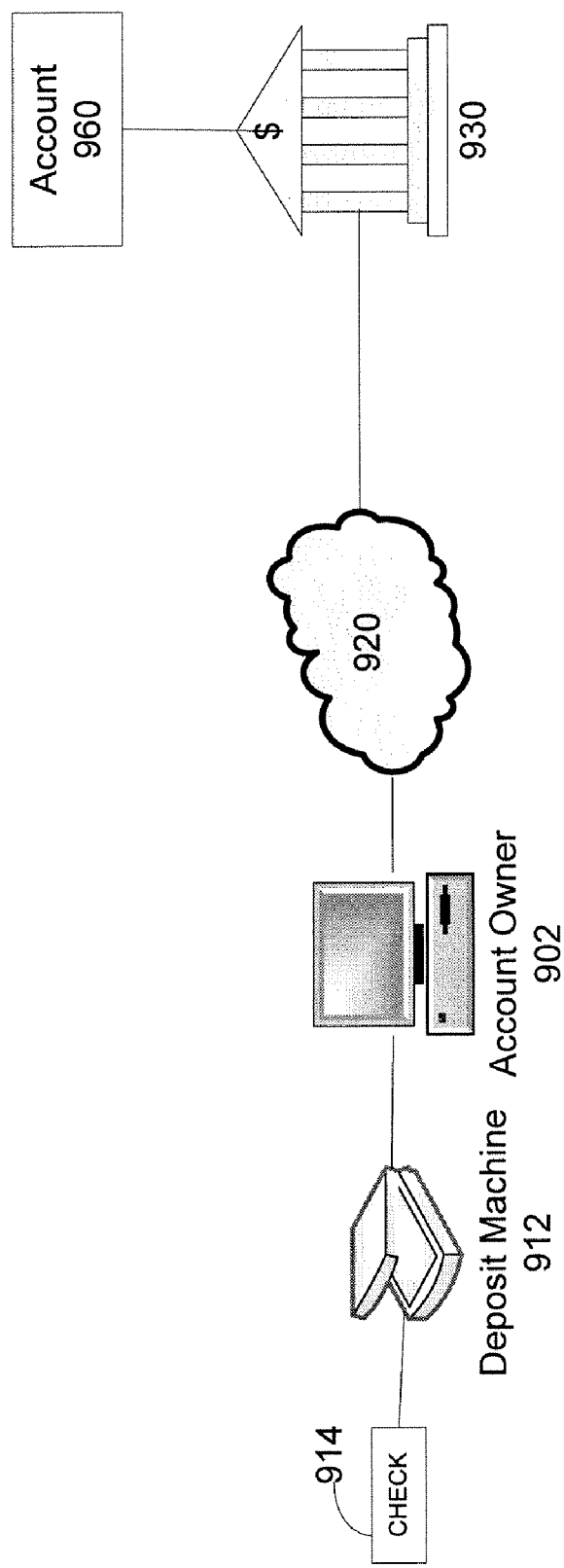
FIG. 9 is an exemplary and non-limiting system for modifying a negotiable instrument using a deposit machine.

The type of scanner used may also be of various types. FIG. 9 illustrates the use of a scanner designed for the deposit and voiding of checks through remote means. Deposit machine 912 is configured to provide deposit services. Deposit machine 912 may be an integrated machine or a system having various parts, including a scanner to create a digital image of a check, such as check 914 and a stimulus generator to cause the application of a stimulus to check 914. Account owner 902 initiates deposit machine 912 to generate a digital image of check 914, the image being transmitted to bank 930 via communication connection 920 for deposit into account 960. After the bank processes the deposit of check 914, bank 930 may transmit a void signal to deposit machine 912 to initiate a void process.

The void signal may be transmitted using various communication methods, including, but not limited to, an internet connection, a telephone connection such as a wireless telephone, or a facsimile transmission if deposit machine 912 is configured to receive facsimile messages. Deposit machine 912 may void check 914 according to the configuration of deposit machine 912 and/or the void message received. For example, deposit machine 912 may be configured to apply an ultraviolet light in response to a void signal. Deposit machine 912 may also be configured to rescan check 914 and send the rescanned digital image to bank 930 to show that the void stimulus has been applied and that check 914 has been voided.

The methods and apparatus of the present subject matter may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the subject matter. When implemented on a general-purpose processor, the program code combines with the processor to provide a unique apparatus that operates to perform the functionality of the present subject matter.

While the present subject matter has been described in connection with the preferred embodiments of the various figures, it is to be understood that other similar embodiments may be used or modifications and additions may be made to the described embodiment for performing the same function of the present subject matter without deviating therefrom. Furthermore, it should be emphasized that a variety of computer platforms, including handheld device operating systems and other application specific hardware/software interface systems, are herein contemplated, especially as the number of wireless networked devices continues to proliferate. Therefore, the present subject matter should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present subject matter should not be limited to specific embodiments described herein but instead construed most broadly.

What is claimed is:

1. A processor-implemented method for redeeming a physical negotiable instrument, comprising:
    receiving a request at a computing device of a financial institution from a computing device of a user to deposit funds of a physical negotiable instrument into an account of the user held by the financial institution,
    wherein the user is remotely located from the financial institution,
    wherein the request comprises a digital image of the physical negotiable instrument, wherein the physical negotiable instrument has a surface that comprises a modifiable ink that is sensitive to a stimulus, wherein the digital image is generated by a user's scanner communicatively coupled to the computing device of the user, wherein the stimulus is a heat or light source of the scanner;
    generating by the computing device of the financial institution a communication to instruct the scanner to void the physical negotiable instrument by applying the stimulus to the modifiable ink on the surface of the physical negotiable instrument, wherein the stimulus to the modifiable ink is generated and applied by the user's scanner;
    transmitting the communication from the computing device of the financial institution to the computing device of the user subsequent to successful receipt of the digital image of the physical negotiable instrument;
    wherein the generated communication is used to instruct the scanner to apply the stimulus to the modifiable ink on the surface of the physical negotiable instrument;
    wherein the physical negotiable instrument is voided by applying the stimulus to the modifiable ink on the surface of the physical negotiable instrument by the user's scanner; and
    receiving confirmation of the application of the stimulus.

2. The method of claim 1, wherein the physical negotiable instrument comprises a check.

3. The method of claim 1, wherein the stimulus is the heat source of the scanner, and voiding the physical negotiable instrument comprises exposing the physical negotiable instrument to the heat source to permanently modify the modifiable ink on the surface, wherein the modifiable ink on the surface of the physical negotiable instrument comprises heat-sensitive ink.

4. The method of claim 1, wherein the stimulus is the light source of the scanner, and voiding the physical negotiable instrument comprises exposing the physical negotiable instrument to the light source to permanently modify the modifiable ink on the surface, wherein the modifiable ink on the surface of the physical negotiable instrument comprises light-sensitive ink.

5. The method of claim 1, wherein the stimulus is the light source of the scanner used to generate the digital image of the physical negotiable instrument and voiding the physical negotiable instrument comprises exposing the physical negotiable instrument to the light source of the scanner for a predetermined time.

6. The method of claim 1, wherein the user owned computing device that generated the request to deposit the physical negotiable instrument further generated the digital image of the physical negotiable instrument.

7. The method of claim 1, further comprising:
    receiving at the computing device of the financial institution an image of the modified physical negotiable instrument as proof of voiding of the physical negotiable instrument from the computing device of the user; and
    depositing by the computing device of the financial institution, in response to receiving the proof of voiding of the physical negotiable instrument, the funds of the physical negotiable instrument into the account of the user held by the financial institution.

8. A system for redeeming a physical negotiable instrument, comprising:
    a memory;
    a processor disposed in communication with said memory, and configured to issue a plurality of processing instructions stored in the memory, wherein the processor issues instructions to:
    receive a request from a computing device of a user to deposit funds of a physical negotiable instrument into an account of the user held by a financial institution, wherein the user is remotely located from the financial institution, wherein the request comprises a digital image of the physical negotiable instrument, wherein the physical negotiable instrument has a surface that comprises a modifiable ink that is sensitive to a stimulus, wherein the digital image is generated by a user's scanner communicatively coupled to the computing device of the user, wherein the stimulus is a heat or light source of the scanner;
    generate a communication to instruct the scanner to void the physical negotiable instrument by applying the stimulus to the modifiable ink on the surface of the physical negotiable instrument, wherein the stimulus to the modifiable ink is generated and applied by the user's scanner;
    transmit the communication to the computing device of the user subsequent to successful receipt of the digital image of the physical negotiable instrument;
    wherein the generated communication is used to instruct the scanner to apply the stimulus to the modifiable ink on the surface of the physical negotiable instrument;
    wherein the physical negotiable instrument is voided by applying the stimulus to the modifiable ink on the surface of the physical negotiable instrument by the user's scanner; and
    receive confirmation of the application of the stimulus.

9. The system of claim 8, wherein the physical negotiable instrument comprises a check.

10. The system of claim 8, wherein the stimulus is the heat source of the scanner, and voiding the physical negotiable instrument comprises exposing the physical negotiable instrument to the heat source to permanently modify the modifiable ink on the surface, wherein the modifiable ink on the surface of the physical negotiable instrument comprises heat-sensitive ink.

11. The system of claim 8, wherein the stimulus is the light source of the scanner, and voiding the physical negotiable instrument comprises exposing the physical negotiable instrument to the light source to permanently modify the modifiable ink on the surface, wherein the modifiable ink on the surface of the physical negotiable instrument comprises light-sensitive ink.

12. The system of claim 8, wherein the stimulus is the light source of the scanner used to generate the digital image of the physical negotiable instrument and voiding the physical negotiable instrument comprises exposing the physical negotiable instrument to the light source of the scanner for a predetermined time.

13. The system of claim 8, wherein the computing device of the user that generated the request to deposit the physical negotiable instrument further generated the digital image of the physical negotiable instrument.

14. The system of claim 8, further comprising:
   a subsystem that:
      receives an image of the modified physical negotiable instrument as proof of voiding of the physical negotiable instrument from the computing device of the user; and
      deposits, in response to receiving the proof of voiding of the physical negotiable instrument, the funds of the physical negotiable instrument into the account of the user held by the financial institution.

15. A non-transitory computer-readable storage medium comprising computer-executable instructions for redeeming a physical negotiable instrument, the instructions comprising instructions to:
   receive a request at a computing device of a financial institution from a computing device of a user to deposit funds of a physical negotiable instrument into an account of the user held by the financial institution, wherein the user is remotely located from the financial institution, wherein the request comprises a digital image of the physical negotiable instrument, wherein the physical negotiable instrument has a surface that comprises a modifiable ink that is sensitive to a stimulus, wherein the digital image of the physical negotiable instrument is generated by a user's scanner communicatively coupled to the computing device of the user, wherein the stimulus is a heat or light source of the scanner;
   generate by the computing device of the financial institution a communication to instruct the scanner to void the physical negotiable instrument by applying the stimulus to the modifiable ink on the surface of the physical negotiable instrument, wherein the stimulus to the modifiable ink is generated and applied by the user's scanner;
   transmit the communication from the computing device of the financial institution to the computing device of the user subsequent to successful receipt of the digital image of the physical negotiable instrument;
   wherein the generated communication is used to instruct the scanner to apply the stimulus to the modifiable ink on the surface of the physical negotiable instrument;
   wherein the physical negotiable instrument is voided by applying the stimulus to the modifiable ink on the surface of the physical negotiable instrument by the user's scanner; and
   receive confirmation of the application of the stimulus.

16. The non-transitory computer-readable storage medium of claim 15, wherein the physical negotiable instrument comprises a check.

17. The non-transitory computer-readable storage medium of claim 15, wherein the stimulus is the heat source of the scanner, and the instructions to void the physical negotiable instrument comprise instructions to expose the physical negotiable instrument to the heat source to permanently modify the modifiable ink on the surface, wherein the modifiable ink on the surface of the physical negotiable instrument comprises heat-sensitive ink.

18. The non-transitory computer-readable storage medium of claim 15, wherein the stimulus is the light source of the scanner, and the instructions to void the physical negotiable instrument comprise instructions to expose the physical negotiable instrument to the light source to permanently modify the modifiable ink on the surface, wherein the modifiable ink on the surface of the physical negotiable instrument comprises light-sensitive ink.

19. The non-transitory computer-readable storage medium of claim 15, wherein the stimulus is the light source of the scanner used to generate the digital image of the physical negotiable instrument and the instructions to void the physical negotiable instrument comprise instructions to expose the physical negotiable instrument to the light source of the scanner for a predetermined time.

20. The non-transitory computer-readable storage medium of claim 15, wherein the computing device of the user that generated the request to deposit the physical negotiable instrument further generated the digital image of the physical negotiable instrument.

21. The non-transitory computer-readable storage medium of claim 15, the instructions further comprising instructions to:
   receive an image of the modified physical negotiable instrument as proof of voiding of the physical negotiable instrument from the computing device of the user; and
   deposit, in response to receiving the proof of voiding of the physical negotiable instrument, the funds of the physical negotiable instrument into the account of the user held by the financial institution.

* * * * *